(12) United States Patent
Cohen et al.

(10) Patent No.: US 9,650,569 B1
(45) Date of Patent: May 16, 2017

(54) METHOD OF MANUFACTURING GARNET INTERFACES AND ARTICLES CONTAINING THE GARNETS OBTAINED THEREFROM

(71) Applicant: Siemens Medical Solutions USA, Inc., Malvern, PA (US)

(72) Inventors: Peter Carl Cohen, Knoxville, TN (US); Robert A. Mintzer, Knoxville, TN (US); Mark S. Andreaco, Knoxville, TN (US); Matthias J. Schmand, Lenoir City, TN (US); Christof Thalhammer, Munich (DE); Harry Hedler, Germering (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/952,175

(22) Filed: Nov. 25, 2015

(51) Int. Cl.
| | |
|---|---|
| *C09K 11/77* | (2006.01) |
| *G01T 1/29* | (2006.01) |
| *C04B 35/50* | (2006.01) |
| *C04B 35/645* | (2006.01) |
| *B33Y 10/00* | (2015.01) |
| *B33Y 80/00* | (2015.01) |

(52) U.S. Cl.
CPC .......... *C09K 11/7706* (2013.01); *C04B 35/50* (2013.01); *C04B 35/645* (2013.01); *G01T 1/2985* (2013.01); *B33Y 10/00* (2014.12); *B33Y 80/00* (2014.12); *C04B 2235/3286* (2013.01); *C04B 2235/602* (2013.01)

(58) Field of Classification Search
CPC . B33Y 10/00; B33Y 80/00; C04B 2235/3286; C04B 2235/602; C04B 35/50; C04B 35/645; G01T 1/2985
See application file for complete search history.

(56) References Cited

U.S. PATENT DOCUMENTS

| | | | |
|---|---|---|---|
| 8,815,122 B2* | 8/2014 | Nakamura | C09K 11/7771 252/301.4 F |
| 2008/0260613 A1* | 10/2008 | Ikada | C01F 17/0025 423/263 |
| 2013/0043430 A1* | 2/2013 | Nakamura | C09K 11/7771 252/301.4 R |
| 2015/0267032 A1* | 9/2015 | Hustad | G03F 7/0002 136/257 |
| 2016/0046860 A1* | 2/2016 | Wang | C09K 11/7771 252/301.4 S |

\* cited by examiner

*Primary Examiner* — Mark R Gaworecki

(57) ABSTRACT

Disclosed herein is a method including disposing in a mold a powder that has a composition for manufacturing a scintillator material and compressing the powder to form the scintillator material; where an exit surface of the scintillator material has a texture that comprises a plurality of projections that reduce total internal reflection at the exit surface and that increase the amount of photons exiting the exit surface by an amount of greater than or equal to 5% over a surface that does not have the projections.

27 Claims, 7 Drawing Sheets

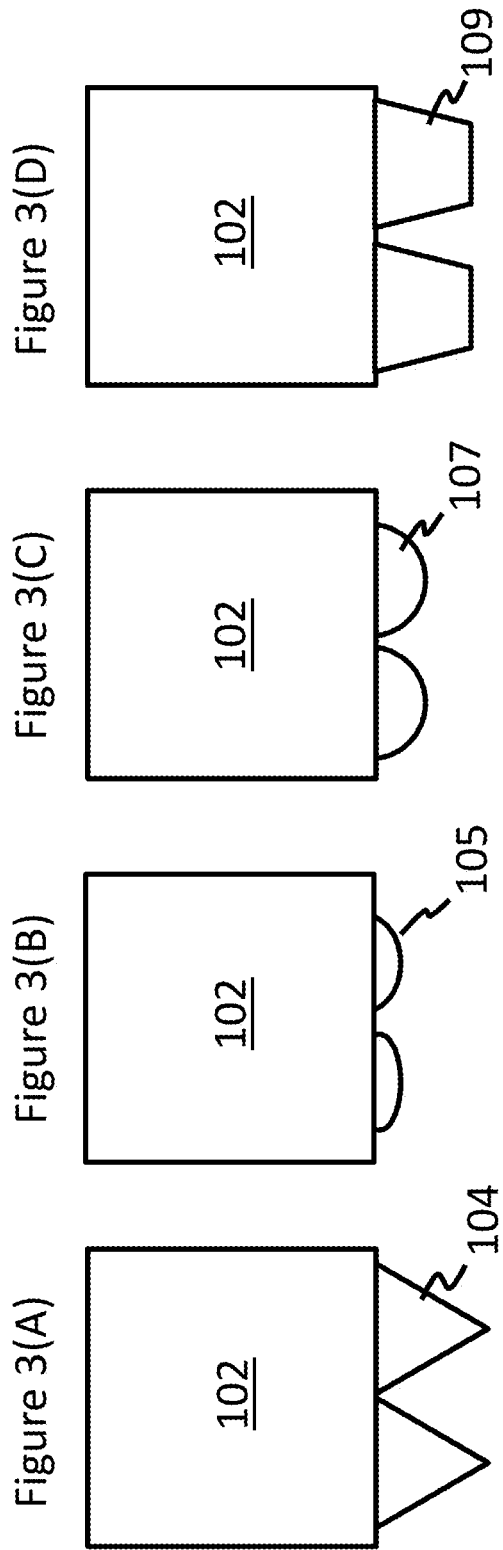

METHOD OF MANUFACTURING GARNET INTERFACES AND ARTICLES CONTAINING THE GARNETS OBTAINED THEREFROM

BACKGROUND

This disclosure relates to a method of manufacturing garnet interfaces and to articles containing the garnets obtained therefrom.

A scintillation detector or scintillation counter is obtained when a scintillator material is coupled to an electronic light sensor such as a photomultiplier tube (PMT), photodiode, silicon photomultiplier, and the like. Photomultiplier tubes absorb the light emitted by the scintillator material and convert it to an electron current via the photoelectric effect. The subsequent multiplication of those electrons (sometimes called photo-electrons) results in an electrical pulse which can then be analyzed and which yields meaningful information about the particle that originally struck the scintillator material. A scintillator is a material that produces light when excited by ionizing radiation. Luminescent materials when struck by an incoming particle, absorb its energy and scintillate, (i.e., re-emit the absorbed energy in the form of light).

A useful characteristic of a scintillator material is the amount of light produced in a scintillation process, which can be measured as a number of scintillation photons produced by the absorption of 1 MeV energy of an ionizing particle. Only a small fraction of the scintillation photons produced in a scintillation event reach the detector. A substantial number of the scintillation photons are lost by absorption or by losses at optical interfaces in the detector module.

One of the ways to improve the efficiency of light collection is to improve the optical clarity of the scintillator material by improving crystal uniformity. This may result in the reduced absorption of scintillation photons and photon transfer properties of the material. Another method is to change the angular exit distribution (the distribution of exit angles) at which the photons exit the surface of the scintillator material.

In timing applications, it is desirable to minimize the number of reflections that occur at the scintillator material exit surface and thus reduce the dispersion of photon arrival times at the light sensor. This may be achieved by modifying the exit surface of the scintillator material by forming a micro-structure of well-defined grooves. By using these groves it is possible to extend range of acceptance angles of incident photons propagating at the exit of the scintillator. FIG. 1 depicts one manner of disposing grooves on the exit surface of the scintillator to reduce the number of photons that are reflected back from the interface due to total internal reflection. FIG. 1 shows a block of glue 106 disposed on an exit surface of a lutetium orthosilicate scintillator (LSO) crystal 102. Also disposed on the exit surface of the scintillator material 102 are micro-textures (i.e., grooves) in the form of an array of pyramids 104. The presence of the pyramids reduces the amount of total internal reflection that would have occurred if the exit surface of scintillator material 102 was flat.

The effect caused by the presence of the pyramids on the exit surface of the scintillator material can be demonstrated by using ray tracking simulations of the scintillator 102 with and without the pyramids 104 as shown in the FIG. 2(A) and the FIG. 2(B) respectively. The FIG. 2(A) depicts the scintillator 102 as having a flat exit surface. Because of this flat exit surface some of the photons that impinge on the surface at an angle that is greater than or equal to the critical angle are reflected completely at the interface back into the scintillator material 102.

FIG. 2(B) depicts a scintillator material 102 surface that is textured with pyramids 104. The pyramids 104 permit a higher percentage of the photons, which have a distribution of incident angles affected by the shape of the scintillator 102 and any surrounding optical elements, to pass through the interface because they are incident upon the interface at angles that are less than the critical angle.

A variety of methods can be used to manufacture the textured exit surface of the scintillator material, such as, for example, mechanical polishing, laser cutting, chemical etching, or even bonding additional structures with a refractive index closely matching that of the scintillator. The latter method is particularly difficult due to the fact that most scintillator materials used for high energy applications have relatively high refractive indices when compared with most optical adhesives used as optical coupling agents. In this case, light reflection losses occur at the optical interface where a significant number of scintillation photons are lost. Moreover, creating such a structure on the surfaces of scintillator materials by methods such as mechanical polishing, laser cutting, or chemical etching produces another problem. High stresses generated during the fabrication of the scintillator material surface result in cracking or crazing of the crystal surface. It is therefore desirable to develop methods for producing scintillator materials with textured surfaces (that can be used to preserve the incident photons) and that do not degrade with time.

SUMMARY

Disclosed herein is a method including disposing in a mold a powder that has a composition for manufacturing a scintillator material and compressing the powder to form the scintillator material; where an exit surface of the scintillator material has a texture that comprises a plurality of projections that reduce total internal reflection at the exit surface and that increase the amount of photons exiting the exit surface by an amount of greater than or equal to 5% over a surface that does not have the projections.

Disclosed herein is a method comprising disposing on an exit surface of a scintillator material a geometrical object by additive manufacturing; where the additive manufacturing comprises adding successive layers of a scintillator material to form the geometrical object; and where the geometrical objects reduce total internal reflection at the exit surface and increase the amount of photons exiting the exit surface by an amount of greater than or equal to 5% over a surface that does not have the geometrical object.

Disclosed herein is an article comprising a scintillator material having a textured exit surface manufactured by a method comprising disposing in a mold a powder that has a composition for manufacturing the scintillator material; and compressing the powder to form the scintillator material; where an exit surface of the scintillator material has a texture that comprises a plurality of projections that reduce total internal reflection at the exit surface and that increase the amount of photons exiting the exit surface by an amount of greater than or equal to 5% over a surface that does not have the projections.

BRIEF DESCRIPTION OF THE FIGURES

FIG. 3(A) shows a plurality of pyramids disposed on an exit surface of the scintillator material;

FIG. 3(B) shows a plurality of ellipsoids disposed on an exit surface of the scintillator material;

FIG. 3(C) shows a plurality of hemispheres disposed on an exit surface of the scintillator material;

FIG. 3(D) shows a plurality of truncated pyramids disposed on an exit surface of the scintillator material;

DETAILED DESCRIPTION

Figure 1:
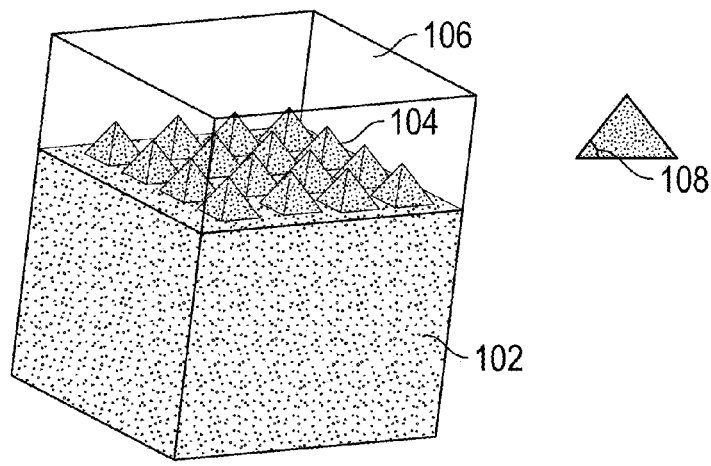
FIG. 1 depicts one manner of disposing grooves on the exit surface of the scintillator to reduce the number of photons that are reflected back from the interface due to total internal reflection.
Figure 2A:
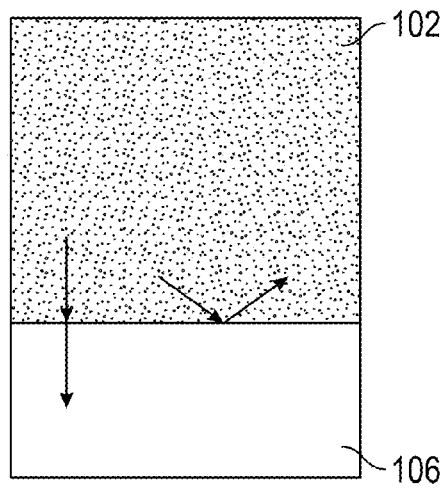
FIG. 2(A) depicts a scintillator having a flat exit surface and the reflections of the photons back into the scintillator material because of total internal reflection.
Figure 2B:
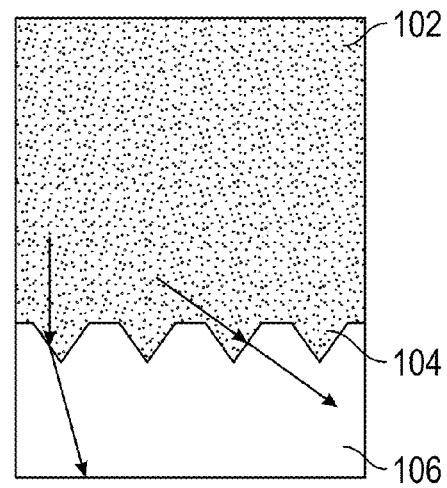
FIG. 2(B) depicts a scintillator material with a textured surface that permits greater photon extraction efficiency because of reduced total internal reflection.

Disclosed herein is a method for manufacturing scintillator materials having textured exit surfaces. The scintillator materials with textured exit surfaces are manufactured in a process that permits grain boundary growth during the manufacturing process. More specifically, powders having a formulation with the defined stoichiometry for producing a desired scintillator material are subjected to compression with simultaneous annealing to facilitate grain boundary growth during the process. Grain boundary growth during the manufacturing process reduces stresses that cause cracking or crazing of the crystal surface. The scintillator materials can be single crystals, polycrystalline, or comprise a combination thereof. They can be manufactured from ceramics but are not limited thereto.

In an embodiment, the method comprises compressing a powder (that has the desired stoichiometry) in a mold that has internal surfaces designed to produce the desired textured surface on the scintillator material. In an embodiment, the mold has an internal surface with a texture that that is opposite to the texture desired on the exit surfaces of the crystal. When the powder is subjected to compression in the mold, the desired texture is transferred to the crystal surface. The method comprises pressing a powder that has a scintillator composition to produce a scintillator material having a textured exit surface. The textured exit surface comprises a plurality of outward or inward projections (hereinafter "geometrical objects") that reduce total internal reflection at the exit surface and that increase the amount of photons exiting the exit surface by an amount greater than or equal to 5% over a surface that does not have the outward projections.

Grain boundary growth processes are driven only by local curvature of the grain boundaries. The reduction of the total amount of grain boundary surface area corresponds to the tendency of the system to minimize total free energy of the system. The process of grain boundary growth to reduce free surface energy can be initiated by applying elastic forces or strains or temperature gradients in the volume of the powder during its compression in the mold. The rate of growth of the grain boundary is proportional to the total amount of free energy at the grain boundary (also sometimes referred to as grain boundary energy). In an embodiment, the process can be applied to ceramic materials sintered without applying a pressure, commonly known as pressureless sintering process. The compressing step can therefore be optional.

The method comprises disposing a powder having the desired stoichiometry in a mold and compressing the powder at a temperature effective to promote grain boundary growth. The powders have a composition that upon being subjected to compression will produce the desired scintillator materials with the textured surfaces. The powder composition can be one of those represented by the formulas detailed below.

In some embodiments, the powdered composition can comprise gadolinium and gallium that has the formula (1):

$$M^1_a M^2_b M^3_c M^4_d O_{12} \qquad (1)$$

where O represents oxygen, $M^1$, $M^2$, $M^3$, and $M^4$ represents a first, second, third, and fourth metal that are different from each other, where the sum of a+b+c+d is about 8, where "about" is defined as ±10% deviation from the desirable value, where "a" has a value of about 2 to about 3.5, preferably about 2.4 to about 3.2, and more preferably about 3.0, "b" has a value of 0 to about 5, preferably about 2 to about 3, and more preferably about 2.1 to about 2.5, where "b" and "c", "b" and "d", or "c" and "d" cannot both be equal to zero simultaneously, where "c" has a value of 0 to about 5, preferably about 1 to about 4, preferably about 2 to about 3, and more preferably about 2.1 to about 2.5, "d" has a value of 0 to about 1, preferably about 0.001 to about 0.5, and more preferably about 0.003 to about 0.3.

In an embodiment, $M^1$ is a rare earth element including but not being limited to gadolinium, yttrium, lutetium, scandium, or a combination of thereof. $M^1$ is preferably gadolinium. $M^2$ is aluminum or boron, $M^3$ is gallium and $M^4$ is a codopant and comprises one or more of thallium, copper, silver, lead, bismuth, indium, tin, antimony, tantalum, tungsten, strontium, barium, boron, magnesium, calcium, cerium, yttrium, scandium, lanthanum, lutetium, praseodymium, terbium, ytterbium, samarium, europium, holmium, dysprosium, erbium, thulium or neodymium.

For $M^1$, some of the gallium can be substituted with one or more of yttrium, gadolinium, lutetium, lanthanum, terbium, praseodymium, neodymium, cerium, samarium, europium, dysprosium, holmium, erbium, ytterbium, or combinations thereof. In an embodiment, some gallium can be substituted with yttrium. $M^3$ is preferably aluminum.

In an embodiment, the codopant $M^4$ includes Tl+, Cu+, Ag+, Au+, Pb2+, Bi3+, In+, Sn2+, Sb3+, Ce3+, Pr3+, Eu2+, Yb2+, Nb5+, Ta5+, W6+, Sr2+, B3+, Ba2+, Mg2+, Ca2+, or combinations thereof.

Some examples of polycrystalline or single crystals grown using the composition of formula (1) by this method are (GAGG—gadolinium-aluminum-gallium garnet), (GGAG—gadolinium-gallium-aluminum garnet), (GYGAG—gadolinium-yttrium-gallium-aluminum garnet), (GSGG—gadolinium-scandium-gallium garnet), (GYAG—gadolinium-yttrium-aluminum garnet), (GSAG—gadolinium-scandium-aluminum garnet), (GGG—gadolinium-gallium garnet), (GYSAG—gadolinium-yttrium-scandium-aluminum garnet) or GLAGG—gadolinium-lutetium-aluminum-gallium garnet). Each of the polycrystalline or single crystals represented by the aforementioned formulas can be co-doped with cerium or praseodymium if desired.

Another composition that can be used to manufacture the textured surface include iodides having the formulas (2), (3) or (4)

$$ASr_{1-x}Eu_xI_3 \qquad (2)$$

$$A_3Sr_{1-x}Eu_xI_5; \qquad (3); or$$

$$ASr_{2(1-x)}Eu_{2x}I_5 \qquad (4)$$

wherein A consists essentially of any alkali metal element such as lithium, sodium, potassium, rubidium, cesium, or a combination thereof, and where $0 \le x \le 1$, preferably $0.05 \le x \le 0.995$, and more preferably $0.1 \le x \le 0.9$. In some embodiments, exemplary compositions include $CsSr_{1-x}Eu_xI_3$, $Cs_3Sr_{1-x}Eu_xI_5$ and $CsSr_{2(1-x)}Eu_{2x}I_5$. Exemplary compositions include $CsSr_{0.9-0.99}Eu_{0.01-0.10}I_3$ and $CsEuI_3$.

In some other embodiments, another composition that can be used to manufacture the textured surface include bromides or halides having the formulas (5) or (6)

$$A_3M^6Br_{6(1-x)}Cl_{6x}, \qquad (5); or$$

$$AM^6{}_2Br_{7(1-x)}Cl_{7x}, \qquad (6)$$

where $0 \le x \le 1$; preferably $0.05 \le x \le 0.995$, and more preferably $0.1 \le x \le 0.9$; wherein A is Li, Na, K, Rb, or a combination thereof; and wherein $M^6$ is cerium, scandium, yttrium, lanthanum, lutetium, gadolinium, praseodymium, terbium, ytterbium, neodymium, or a combination thereof.

In other embodiments, the compositions that are used to manufacture the textured surface are lutetium orthosilicates (LSO) having the formula (7)

$$M^7{}_{2x}Lu_{2(1-x)}SiO_5 \qquad (7)$$

where $M^7$ is cerium, scandium, yttrium, lanthanum, lutetium, gadolinium, praseodymium, terbium, ytterbium, neodymium, or a combination thereof, preferably cerium; where x is 0.001 to 0.1, preferably 0.005 to 0.015. An exemplary LSO composition is $Ce:Lu_2SiO_5$.

The powders used to make the scintillator materials comprise particles that have an average particle size that range from 2 nanometers to 500 micrometers, preferably 5 nanometers to 50 nanometers, The radius of gyration of the particles is measured to determine average particle size. Light scattering or electron microscopy can be used to determine the particle size.

The powders can be further pulverized in a ball mill, roll mill, or other pulverizing device. The pulverized powders can then be subjected to an optional sieving process if it is desirable to use particles of a particular size. Powder particles can be made using Spray Flame Pyrolysis (FSP), Flame Spray Assisted Pyrolysis (FSAP) methods or by using a variety of 'wet chemistry' synthesis methods including sol-gel synthesis-based methods.

The desired powders can be disposed in a mold (also referred to as a die) and subjected to isostatic pressing (also referred to as hydrostatic pressing or hot isostatic pressing) or uniaxial compression. Isostatic pressing can be conducted at room temperature (23° C.) or at elevated temperatures. In isostatic pressing, an inert gas such as argon can be used to apply pressure to the powders contained in the mold, so that the powder does not chemically react with the gas or with itself. The mold is optionally heated, causing the pressure inside the mold to increase. Many systems use associated gas pumping to achieve the desired pressure level. Pressure is applied to the material from all directions (hence the term "isostatic").

The inert gas is applied isostatically (also termed hydrostatically) at a pressure of 7,350 psi (1 MPa) and 45,000 psi (500 MPa), preferably 10,000 psi (66 MPa) to 30,000 psi (195 MPa). In some embodiments, the temperature during the pressing can be room temperature. In another embodiment, elevated temperatures of 900° F. (482° C.) to 3992° F. (2200° C.), preferably 1472° F. (800° C.) to 3962° F. (2000° C.) and more preferably 1650° F. (900° C.) to 1750° F. (3182° C.) can be used during the application of isostatic or uniaxial pressure.

The annealing is preferably conducted via convective or conductive heat transfer. In an embodiment, radiative heating (e.g. radiofrequency heating, microwave heating, or infrared heating) can be conducted simultaneously or sequentially with the convective or conductive heating. In an embodiment, the heating is conducted via conduction or a combination of conduction and convection while the sample is still in the press and under pressure.

The heating and pressing of the composition can be conducted simultaneously or sequentially. In an embodiment, the heating and pressing of the composition can be conducted simultaneously. The simultaneous application of heat and pressure eliminates internal voids and microporosity through a combination of plastic deformation, creep, grain boundary growth and diffusion bonding. The process improves fatigue resistance of the component and reduces cracking and crazes during use.

In uniaxial compression, the pressures and temperatures defined above for isostatic compression can be used. However, the compressive pressure is applied only in two mutually opposing directions to produce the scintillator material. In uniaxial compression, pressure can be applied to the powder contained in the mold by using opposing rams with a small clearance from the walls of the mold. The wall clearance is used to prevent the rams from being seized in the mold. The wall clearance is dependent upon the powder particle size and can be varied depending upon the particle sizes. The larger the particle size, the larger the wall cavity clearance.

In some embodiments, a binder or lubricant can be used in conjunction with the powder during the pressing operation. The lubricant facilitates ease of mobility of the rams in the mold during the compression. A binder can be used to bind the particles to prevent particle loss during the pressing operation.

The texturing can comprise disposing a variety of different geometrical objects on an exit surface of the scintillator material. The texturing can include outward projections or inward projections. An outward projection can include disposing a geometrical object on an exit surface of the scintillator material. An inward projection can include cutting the geometrical object out of the scintillator material at its exit surface. The inward projection would therefore include a hollowing out of the scintillator material to accommodate the geometrical object. Combinations of inward and outward projections may also be used. In an embodiment, the texturing can comprise geometrical objects that are photonic crystals. A photonic crystal is a periodic optical nanostructure that affects the motion of photons in much the same way that ionic lattices affect the motion of electrons in solids.

The geometries are preferably 3-dimensional geometries with the base of the geometrical object disposed in such a manner so as to contact the exit surface of the scintillator material. The geometry (of the geometrical object) chosen should preferably be one where a photon contacts the exit surface of the geometrical object at an angle less than the critical angle. The geometries include pyramids, cones, hemispheres, ellipsoids, truncated pyramids, buckyballs (fullerenes), truncated cones, truncated hemispheres, truncated ellipsoids, truncated spheres, truncated fullerenes, or the like, or a combination thereof. Combinations of shapes can be used, such as a fullerene mounted on a truncated pyramid, a sphere mounted on a conical section, and so on. Hierarchical structures can also be used. For example, a hemisphere disposed on another hemisphere may also be used to form the texturing. In an exemplary embodiment, the geometrical object disposed on the exit surface of the scintillator material is a pyramid.

The FIG. 3(A) shows a plurality of pyramids 104 disposed on an exit surface of the scintillator material. The FIG. 3(B) shows a plurality of ellipsoids 105 disposed on an exit surface of the scintillator material. The FIG. 3(C) shows a plurality of hemispheres 107 disposed on an exit surface of the scintillator material. The FIG. 3(D) shows a plurality of truncated pyramids 109 disposed on an exit surface of the scintillator material. While the FIG. 3(D) shows the truncated surface as being parallel to the exit surface of the scintillator material, it can be non-parallel if so desired.

The angle of contact between a side of the geometrical object and the exit surface determines the efficiency of photon extraction. The FIG. 4(A) shows how the angle is measured when the geometrical object is an outward projection such as, for example, a pyramid 104. In the FIG. 4(A), the angle α between a side of the pyramid 104 and the exit surface of the scintillator material 102 is used as a measure of the extraction efficiency. This approach can be used for other geometrical objects such as truncated pyramids, cones, conical sections, or the like.

Figure 4B:
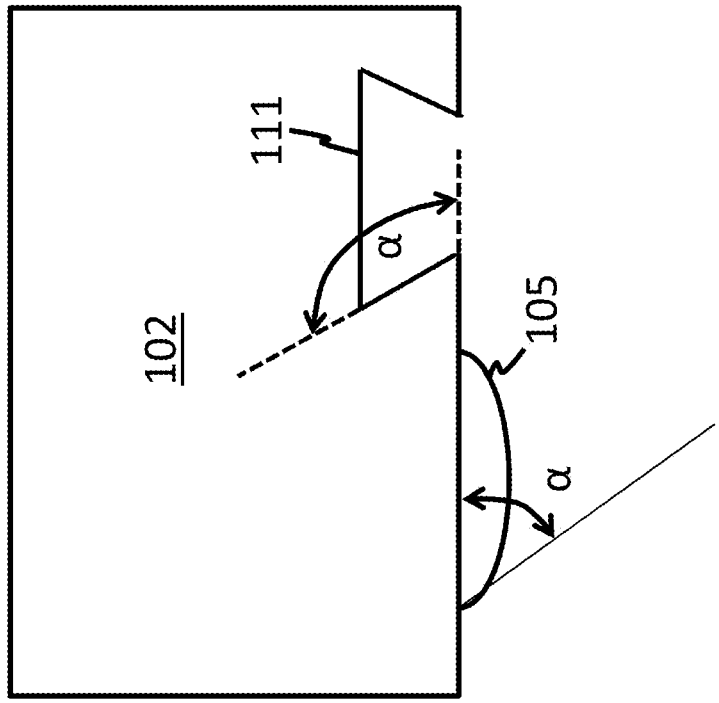
FIG. 4(B) shows how the angle α is measured when the geometrical object is an ellipsoid 105.
Figure 4A:
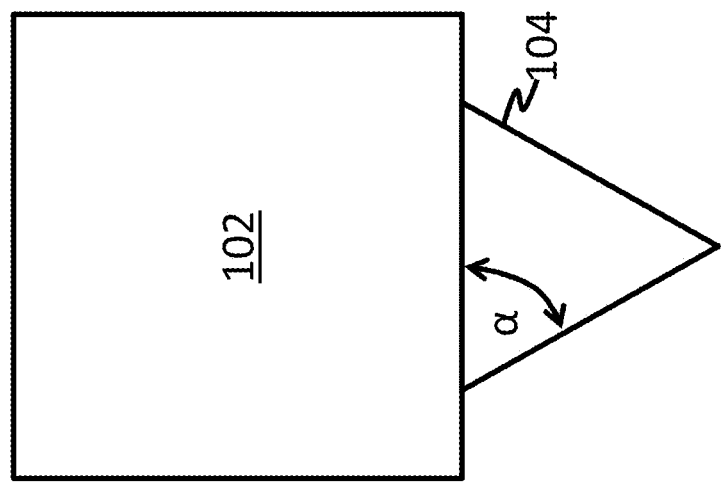
FIG. 4(A) shows how the angle α is measured when the geometrical object is a pyramid.

In the FIG. 4(B), there are two geometrical objects—an outward projecting geometrical object (an ellipsoid 105) and an inward projecting geometrical object (a wedge 111). The outward projecting geometrical object is an ellipsoid 105. The angle α between a tangent to a surface of the ellipsoid at the point of contact of an edge of the ellipsoid with the exit surface of the scintillator material is used as a measure of the extraction efficiency. This approach can be used for other geometrical objects such as hemispheres, fullerenes, truncated fullerenes, or the like.

For the inward projecting geometrical object in the FIG. 4(B), the angle α between a tangent to a surface of the wedge 111 at the point of contact of an edge of the wedge 111 with the exit surface of the scintillator material is used as a measure of the extraction efficiency.

The angle α is preferably less than the critical angle for the scintillator material. In an embodiment, the angle α can vary from 25 to 60 degrees, preferably 30 to 55 degrees and more preferably 35 to 45 degrees for outward projections. It is to be noted that for inward projections the a can be greater than 90 degrees and can vary from 25 to 135 degrees, preferably 65 to 130 degrees and more preferably from 95 to 125 degrees. The Table 1 below shows how the extraction efficiency of photons varies with the angle α in a scintillator having textured surfaces. The values shown in the Table 1 were the result of a simulation study.

TABLE 1

| Angle (α) | Extraction Efficiency |
| --- | --- |
| 0 [flat surface] | 48% |
| 30 | 65% |
| 40 | 65% |
| 45 | 65% |
| 50 | 64% |
| 60 | 60% |

The simulation shows that significantly larger amounts of photons approaching the interface can be successfully extracted without undergoing multiple internal reflections. The calculations using LSO indicate an increase in light yield of about 17% for a having a value of 40 degrees over those surfaces where a has a value of 0 degrees. From the data above, it can be seen that by disposing the geometrical objects on the exit surface of the scintillator material, the extraction efficiency of photons is increased by an amount greater than 5%, preferably 5 to 25%, preferably 8 to 22%, and more preferably 10 to 20%.

In an embodiment, each geometrical object disposed on the exit surface of the scintillator material has dimensions that are of the order of the wavelength of light (i.e., they are in the micrometer and nanometer dimensional range). In an embodiment, the dimensions (such as the width(s) and height of a pyramid or the radius of a sphere or the small and large axis of an ellipsoid) of the geometrical object are 50 nanometers to 700 nanometers, preferably 100 to 600 nanometers and more preferably 300 to 500 nanometers. The periodicity between geometrical objects can be from 50 nanometers to 1000 micrometers, preferably 400 nanometers to 500 micrometers.

In one embodiment, the texturing can be added using additive manufacturing (3D printing) where the geometrical objects are added to the surface of the scintillator under computer control. In 3D manufacturing, successive layers of material are formed under computer control to form an object of the desired geometry. In particular, additive manufacturing comprises adding successive layers of a scintillator material to form the geometrical object. The entire object (the scintillator material with the added geometrical objects) can be subjected to optional annealing at the appropriate temperatures to facilitate grain growth if desired.

The method disclosed herein for manufacturing the scintillator material has a number of advantages. The texturing can be disposed on the scintillator material to improve photon extraction efficiency without causing crazing or cracking. It reduces or eliminates internal voids and microporosity through plastic deformation, creep, and grain boundary growth. The process improves fatigue resistance of the component. The scintillator materials manufactured herein can be used in imaging articles and devices such as, for example, positron emission tomography, a computed tomography or single photon emission computed tomography machines.

The scintillator material and the method disclosed herein is exemplified by the following non-limiting example.

EXAMPLE

Figure 5:
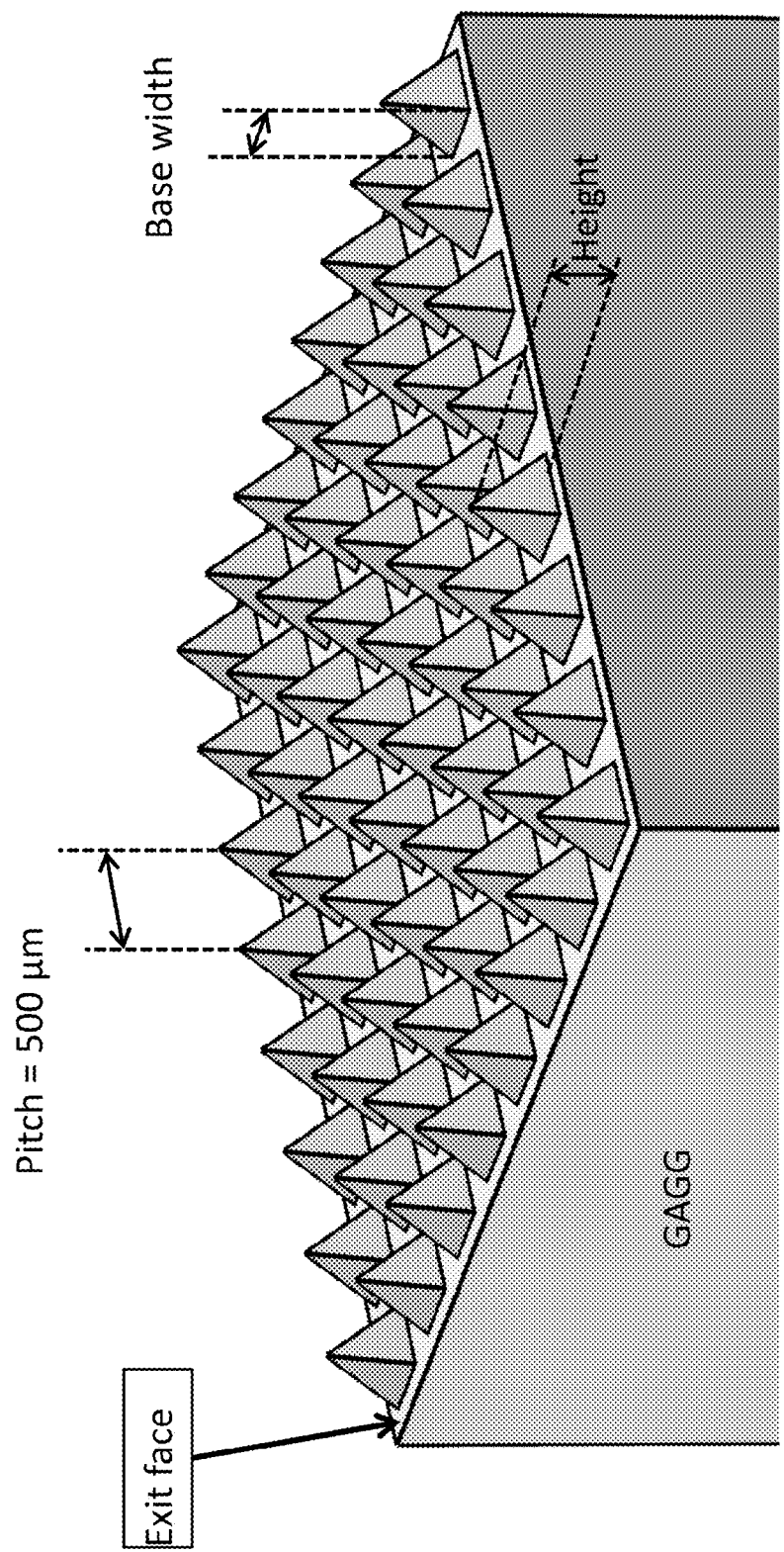
FIG. 5 shows one embodiment where the texturing includes disposing a plurality of pyramids on an exit surface of the scintillator material.
Figure 6:
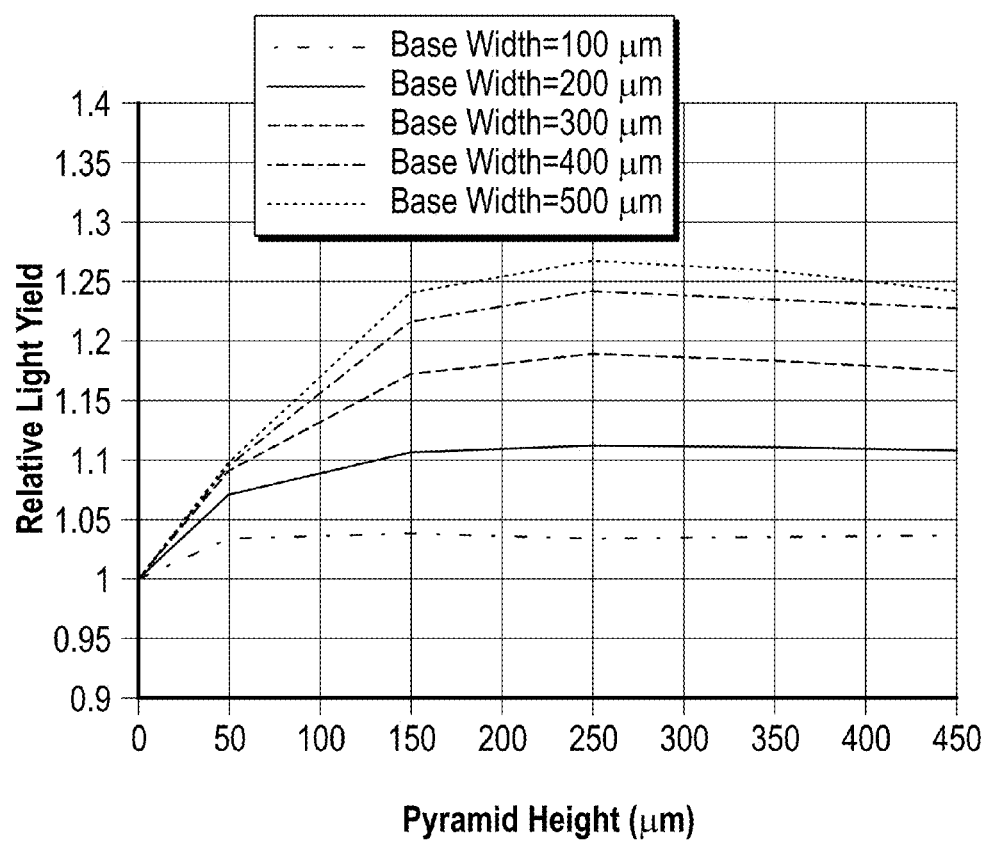
FIG. 6 is a graph that shows that the gain light yield is increased by up to 27% when the width is varied from 100 to 500 micrometers.

This example shows how the extraction efficiency increases with optimization of dimensions in a plurality of geometrical objects disposed on an exit surface of the crystal. The FIG. 5 shows one embodiment where the texturing includes disposing a plurality of pyramids on an exit surface of the scintillator material. The widths of the base of the pyramid were varied from 100 to 500 micrometers. The pitch (periodicity) between pyramids is selected to be 500 micrometers. The FIG. 6 is a graph that shows that the gain light yield is increased by up to 27% when the width is varied from 100 to 600 micrometers.

Figure 7:
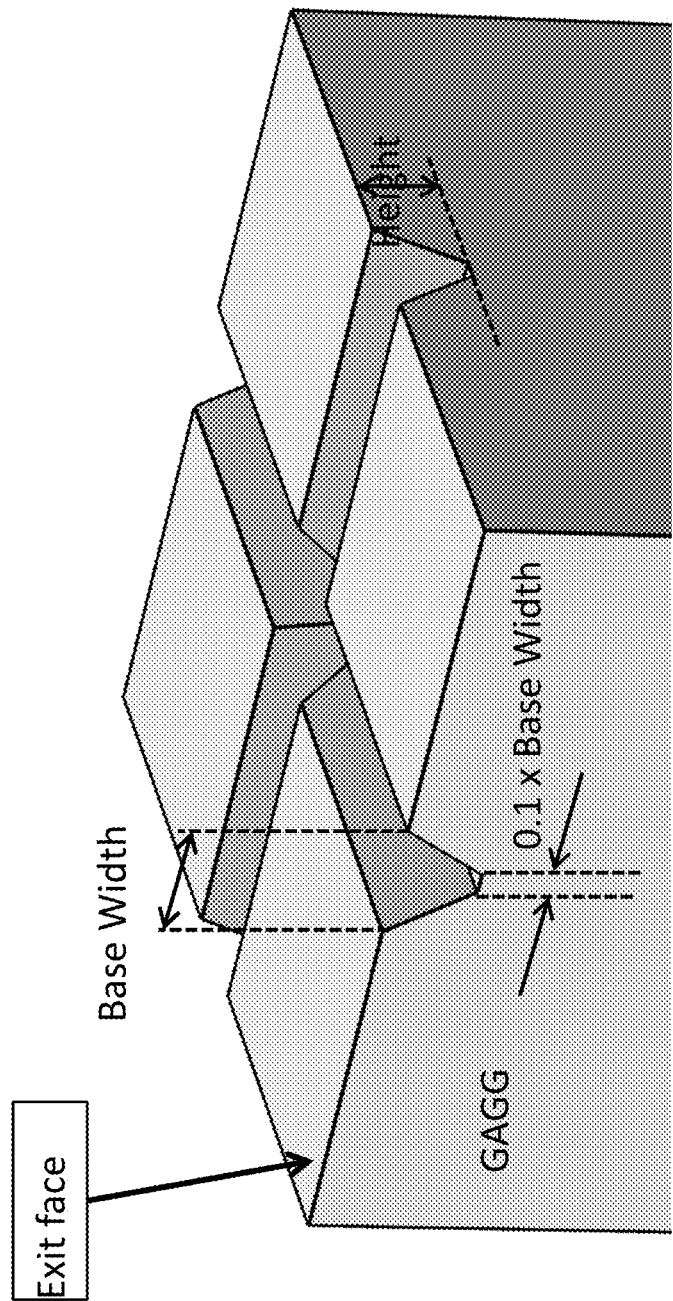
FIG. 7 shows a surface where the texture comprises a plurality of truncated pyramids.
Figure 8:
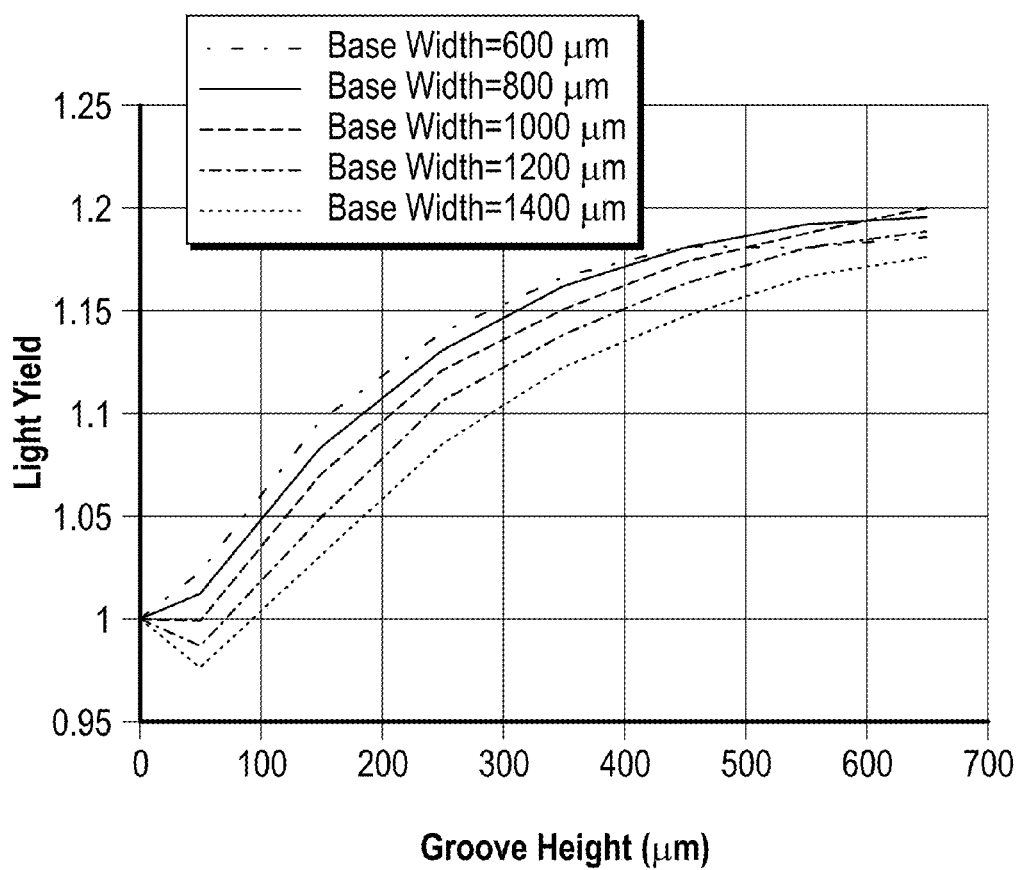
FIG. 8 is a graph that shows the light yield from the surface of the texture of the FIG. 7.

FIG. 7 shows a surface where the texture comprises truncated pyramids. FIG. 8 is a graph that shows the light yield from the surface of the texture of the FIG. 7. From the FIG. 8 it may be seen that the gain in light yield is increased by up to 20% when the width of the pyramid is 600 to 1400 micrometers.

It is to be noted that all ranges detailed herein include the endpoints. Numerical values from different ranges are combinable.

The transition term comprising encompasses the transition terms "consisting of" and "consisting essentially of".

The term "and/or" includes both "and" as well as "or". For example, "A and/or B" is interpreted to be A, B, or A and B.

The terms "a" and "an" and "the" do not denote a limitation of quantity, and are to be construed to cover both the singular and the plural, unless otherwise indicated herein or clearly contradicted by context.

Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method comprising:
   disposing in a mold a powder that has a composition for manufacturing a scintillator material; and
   compressing the powder to form the scintillator material;
   where an exit surface of the scintillator material has a texture that comprises a plurality of projections that reduce total internal reflection at the exit surface and that increase the amount of photons exiting the exit surface by an amount greater than or equal to 5% over a surface that does not have the projections.

2. The method of claim 1, where the scintillator material has a composition of formula (1),

$$M^1_a M^2_b M^3_c M^4_d O_{12} \quad (1)$$

where
O represents oxygen,
$M^1$, $M^2$, $M^3$, and $M^4$ represents a first, second, third and fourth metal that are different from each other,
the sum of a+b+c+d is about 8, where
"a" has a value of about 2 to about 3.5,
"b" has a value of 0 to about 5,
"c" has a value of 0 to about 5,
"d" has a value of 0 to about 1, where "b" and "c", "b" and "d" or "c" and "d" cannot both be equal to zero simultaneously,
$M^1$ is rare earth element selected from the group consisting of gadolinium, yttrium, lutetium, scandium, and a combination of thereof,
$M^2$ is aluminum or boron,
$M^3$ is gallium, and
$M^4$ is a codopant and comprises one of thallium, copper, silver, lead, bismuth, indium, tin, antimony, tantalum, tungsten, strontium, barium, boron, magnesium, calcium, cerium, yttrium, scandium, lanthanum, lutetium, praseodymium, terbium, ytterbium, samarium, europium, holmium, dysprosium, erbium, thulium or neodymium.

3. The method of claim 2, where for $M^1$, a portion of the gadolinium can be substituted with one or more of yttrium, lutetium, lanthanum, terbium, praseodymium, neodymium, cerium, samarium, europium, dysprosium holmium, erbium, ytterbium, or combinations thereof.

4. The method of claim 2, where $M^1$ is gadolinium and $M^2$ is aluminum.

5. The method of claim 2, where
"a" has a value about 2.4 to about 3.2,
"b" has a value of about 2 to about 3,
"c" has a value of about 1 to about 4, and
"d" has a value of about 0.001 to about 0.5.

6. The method of claim 1, where the projections include outward projections, inward projections or a combination thereof.

7. The method of claim 1, where the projections comprise geometrical objects that have a side that is inclined to the exit surface at an angle of 30 to 60 degrees.

8. The method of claim 7, where the geometrical objects have at least one dimension that is 50 to 700 nanometers in size.

9. The method of claim 7, where the geometrical objects are pyramids, cones, hemispheres, ellipsoids, truncated pyramids, fullerenes, truncated cones, truncated hemispheres, truncated ellipsoids, truncated spheres, truncated fullerenes, or a combination thereof.

10. The method of claim 7, where a periodicity between the geometrical objects is 300 nanometers to 1000 micrometers.

11. The method of claim 1, where compressing the powder includes uniaxial compression or isostatic compression.

12. The method of claim 11, where the uniaxial compression or isostatic compression is conducted at a pressure of 1 MPa to 500 MPa.

13. The method of claim 11, where the uniaxial compression is conducted at room temperature.

14. The method of claim 11, where grain boundary growth occurs n the scintillator material during the compressing.

15. The method of claim 1, further comprising heating the powder via thermal conduction or convection.

16. The method of claim 15, where the powder is heated to a temperature of 480° C. to 2200° C.

17. The method of claim 1, further comprising heating the powder via electromagnetic radiation.

18. A method comprising:
    disposing on an exit surface of a scintillator material a geometrical object by additive manufacturing;
    where the additive manufacturing comprises adding successive layers of a scintillator material to form the geometrical object; and
    where the geometrical objects reduce total internal reflection at the exit surface and increase the amount of photons exiting the exit surface by an amount of greater than or equal to 5% over a surface that does not have the geometrical object.

19. The method of claim 18, further comprising heating the scintillator material.

20. An article comprising:
a scintillator material having a textured exit surface manufactured by a method comprising:
disposing in a mold a powder that has a composition for manufacturing the scintillator material; and
compressing the powder to form the scintillator material; where an exit surface of the scintillator material has a texture that comprises a plurality of projections that reduce total internal reflection at the exit surface and that increase the amount of photons exiting the exit surface by an amount of greater than or equal to 5% over a surface that does not have the projections.

21. The article of claim 20, where the outward projections comprise geometrical objects that have a side that is inclined to the exit surface at an angle of 30 to 60 degrees.

22. The method of claim 21, where the geometrical objects have at least one dimension that is 50 to 700 nanometers in size.

23. The method of claim 21, where the geometrical objects are pyramids, cones, hemispheres, ellipsoids, truncated pyramids, fullerenes, truncated cones, truncated hemispheres, truncated ellipsoids, truncated spheres, truncated fullerenes, or a combination thereof.

24. The method of claim 21, where a periodicity between geometrical objects is 50 nanometers to 1000 micrometers.

25. The method of claim 21, where the geometrical objects comprise photonic crystals.

26. An imaging device comprising the article of claim 20.

27. The imaging device of claim 26, where the imaging device is a positron emission tomography, a computed tomography or a single photon emission computed tomography machine.

* * * * *